United States Patent [19]
Dillmann

[11] Patent Number: 5,577,084
[45] Date of Patent: Nov. 19, 1996

[54] APPARATUS FOR REMOVING AND INSTALLING A RECIRCULATION PUMP IN A PRESSURE HOUSING

[75] Inventor: Charles W. Dillmann, Morgan Hill, Calif.

[73] Assignee: General Electric Company, San Jose, Calif.

[21] Appl. No.: 437,193

[22] Filed: May 8, 1995

[51] Int. Cl.⁶ .................................................. G21C 19/28
[52] U.S. Cl. ......................... 376/406; 376/271; 376/272
[58] Field of Search ................................. 376/406, 271, 376/272; 250/506.1

[56] References Cited

U.S. PATENT DOCUMENTS

| | | | |
|---|---|---|---|
| 3,580,410 | 5/1971 | Abolins | 220/1.5 |
| 3,765,549 | 10/1973 | Jones | 214/18 N |
| 3,945,509 | 3/1976 | Weems | 214/16 B |
| 3,980,188 | 9/1976 | Weems | 214/152 |
| 3,982,134 | 9/1976 | Housholder | 250/506 |
| 4,445,042 | 4/1984 | Baatz et al. | 250/506.1 |
| 4,456,827 | 6/1984 | Botzem et al. | 250/506.1 |
| 4,555,129 | 11/1985 | Davlin | 285/3 |
| 4,926,046 | 5/1990 | Roy et al. | 250/506.1 |
| 5,406,600 | 4/1995 | Jones et al. | 376/272 |
| 5,475,721 | 12/1995 | Baatz et al. | 376/272 |

*Primary Examiner*—Charles T. Jordan
*Assistant Examiner*—Meena Chelliah
*Attorney, Agent, or Firm*—James E. McGinness

[57] ABSTRACT

An apparatus for removing and installing a reactor component, such as a circulating pump, by remote operation. The apparatus includes a handling mechanism for transporting various interchangeable containers and tools along a path between a position on top of the suppression pool and a position overlying the reactor component. The handling mechanism has a yoke assembly adapted to receive and support the trunnions of any container or tool, lifting screws for raising and lowering the yoke assembly and an arcuate rack mounted on the shield wall for rotating the yoke assembly around the circumference of the shield wall. A transition collar is latched onto the pump pressure housing. The transition collar has a valve at the top for closing off its interior. Seals arranged between the transition collar and pressure housing to ensure water-tightness. A quick disconnect flange is provided to facilitate coupling of an upper flange on the transition collar to a flange of the interchangeable container or tool carried by the handling mechanism.

16 Claims, 6 Drawing Sheets

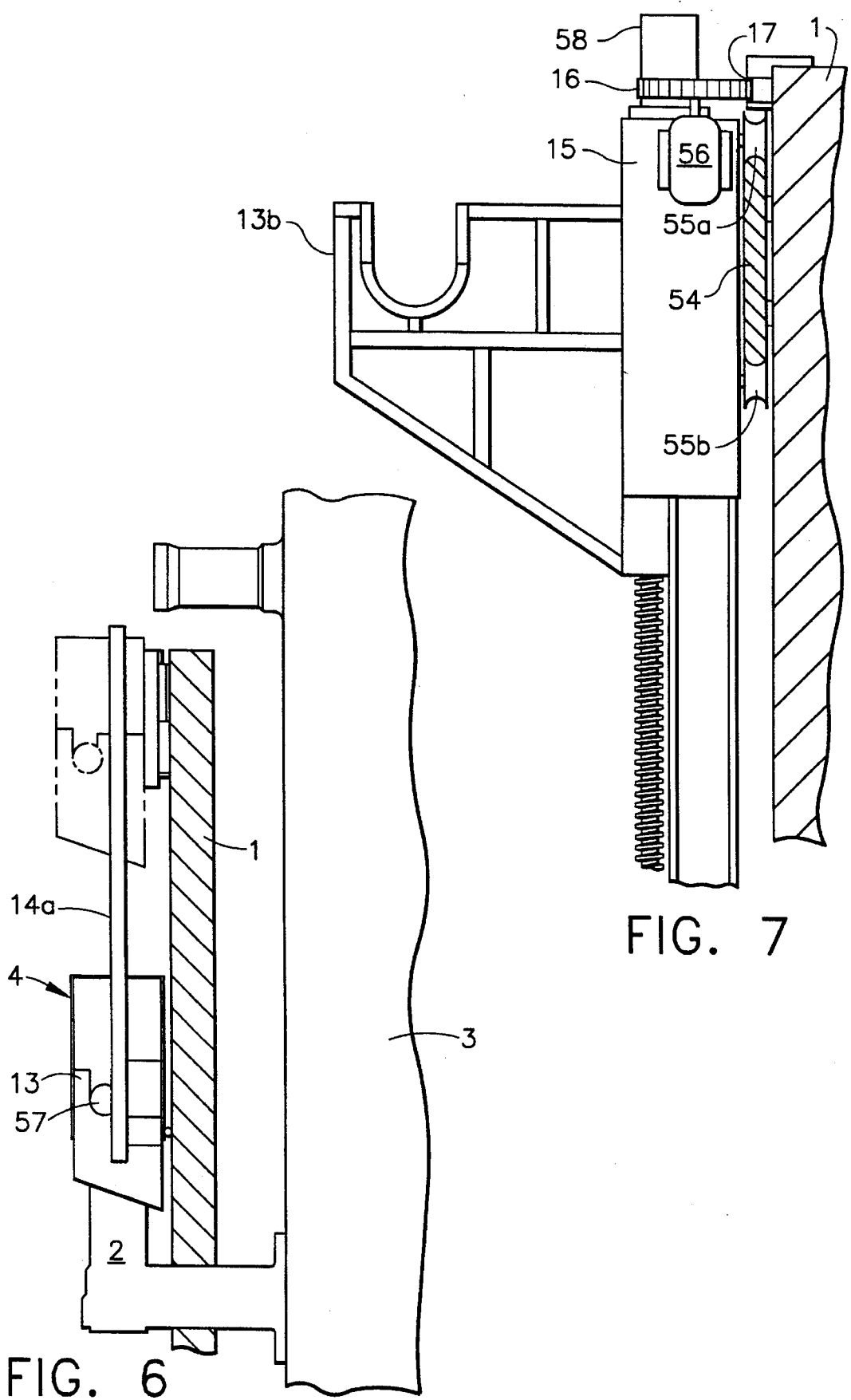

APPARATUS FOR REMOVING AND INSTALLING A RECIRCULATION PUMP IN A PRESSURE HOUSING

FIELD OF THE INVENTION

This invention relates generally to devices for removing and installing components of a nuclear reactor which components form a portion of or are contained in the nuclear reactor. Specifically, the invention relates to an apparatus for removing and installing a circulating pump in a pressure housing that is mounted on the side of the reactor pressure vessel.

BACKGROUND OF THE INVENTION

A boiling water reactor includes a reactor pressure vessel containing a nuclear reactor fuel core submerged in water. The fuel core heats the water to generate steam which is discharged from the reactor pressure vessel through a main steam line and used to power a steam turbine-generator for producing electrical power. Condensate formed in a condenser may be returned to the vessel by a feed pump. Only a small portion (<20%) of the coolant entering the fuel is converted to steam. Thus the fluid exiting the fuel is a mixture of steam and water. The steam/water mixture is routed through a set of steam separators and dryers, the steam being routed to the turbine and the water being mixed with the returned condensate and routed back to the fuel. The flow being returned to the fuel is called "recirculation flow" and is pumped through the fuel by a recirculation pump. The recirculation pump is conventionally installed in a pump housing 2 mounted on the side of the reactor pressure vessel 3, as shown in FIG. 1. The main steam line for steam exiting the reactor pressure vessel on its way to the turbine-generator is indicated by numeral 18.

The reactor pressure vessel is surrounded by a containment vessel 19. The volume inside the containment vessel and outside the reactor pressure vessel forms the drywell 20, which typically contains a noncondensable gas such as nitrogen. The containment vessel 19 is a concrete structure having a steel liner and is designed to withstand elevated pressure inside the drywell.

In accordance with the conventional containment design, an annular suppression pool 22 surrounds the reactor pressure vessel within the containment vessel. The suppression pool is partially filled with water 24 to define a wetwell airspace or plenum 26 thereabove. The suppression pool 22 serves various functions, including being a heat sink in the event of an accident which causes steam from the reactor pressure vessel 3 to leak into the drywell 20. Following the accident, the reactor is shut down, but pressurized steam and residual decay heat continue to be generated for a certain time thereafter. Steam escaping into the drywell 20 is channeled into the suppression pool 22 through vertical downcomer ducts 27 distributed at respective azimuthal positions along the inboard bounding wall 21 of the suppression pool. Each downcomer duct 27 communicates with a plurality of (e.g., three) horizontal vents 28, as seen in FIG. 1.

The circulating pump pressure housing 2 is located in the annular space between the inboard bounding wall 21 of the suppression pool and a circular cylindrical shield wall 1 which encircles the reactor pressure vessel. In the course of reactor maintenance, it may be necessary to replace a defective circulating pump inside pressure housing 2. In that event, the pump motor and impeller assembly must be removed from the housing and a new pump motor and impeller assembly must be installed in its place. To facilitate removal and installation of the pump assembly, the pressure housing 2 has a cover 42 (see FIG. 4) which is removed to provide access to inside the housing. However, the operation of removing and installing a pump motor and impeller assembly must be performed in the narrow annular space between inboard bounding wall 21 of the suppression pool and the shield wall 1. In addition, once the pump assembly has been removed from housing 2, the removed pump assembly must be moved to a specific azimuthal position which has overhead clearance to raise the pump assembly to the level of the refueling floor, where the pump assembly can be transferred to a cart and removed from the drywell. Thus, there is a need for an apparatus which can operate within the confined annular space where the circulating pump is located, and which can remove a pump assembly from or install a pump assembly in the pressure housing with minimum reactor downtime.

SUMMARY OF THE INVENTION

The present invention is an apparatus for removing and installing a component of a nuclear reactor by remote operation. In particular, the preferred embodiment of the apparatus is designed for removing and installing a circulating pump in a pressure housing.

The apparatus of the invention comprises a handling mechanism for transporting various interchangeable containers and tools along a path between a position on top of the suppression pool and a position overlying the location of the reactor component of interest. Each container and tool has a pair of trunnions having predetermined geometry and dimensions. The handling mechanism has a yoke assembly adapted to receive and support the trunnions of any container or tool, lifting screws for raising and lowering the yoke assembly and an arcuate rack mounted on the shield wall for rotating the yoke assembly around the circumference of the shield wall.

In accordance with the preferred embodiment of the invention, the handling mechanism is mounted on the outer circumference of the shield wall of a boiling water reactor and is adapted to carry a container or tool vertically or circumferentially in the annular space between the shield wall and the inner bounding wall of the suppression pool. Specifically, the handling mechanism carries containers and tools to a position overlying a pump pressure housing.

In accordance with the preferred embodiment, a transition collar is latched onto the pump pressure housing. The transition collar has a valve at the top for closing off its interior. Seals are arranged between the transition collar and pressure housing to ensure water-tightness. A quick disconnect flange is provided to facilitate coupling of an upper flange on the transition collar to a flange of the interchangeable container or tool carried by the handling mechanism.

To accomplish removal of a pump motor and impeller assembly from a pressure housing, a bolt torquing and detorquing tool is lowered into position by the handling mechanism, attached to the transition collar and operated to detorque the bolts on the pressure housing cover. After the bolt torquing and detorquing tool is removed, a container for capturing and transporting the cover is attached to the transition collar. The container has hoisting and grappling means for pulling the cover into the container and valve means for closing the container with the cover inside. After the cover removal container is removed by the handling mechanism, a cask for transporting the pump assembly is attached to the transition collar. The cask has hoisting and grappling means for pulling the pump assembly into the cask and valve means for closing the cask with the pump assembly inside. The cask with pump assembly inside can then be removed by the handling mechanism. The sequence of operations is reversed for installing a pump assembly inside a pressure housing.

BRIEF DESCRIPTION OF THE DRAWINGS

FIG. 6 is a schematic diagram showing a handling mechanism, mounted on the shield wall, for raising and lowering the various tools and containers along a vertical path above a pressure housing.

FIGS. 7 and 8 are side and front elevational views respectively of the shield wall-mounted handling mechanism shown in FIG. 6.

DETAILED DESCRIPTION OF THE PREFERRED EMBODIMENTS

Figure 1:
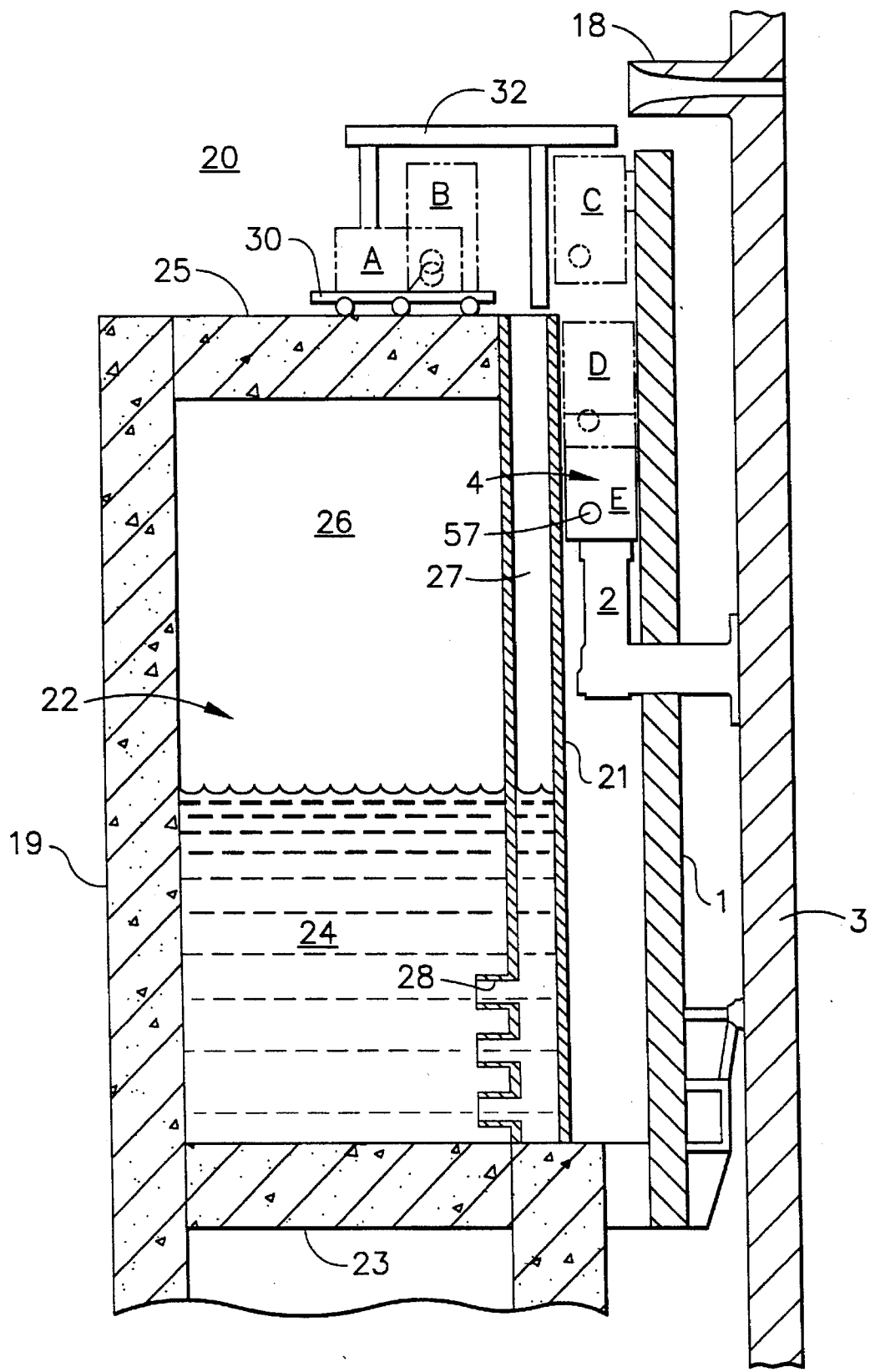
FIG. 1 is a schematic sectional view of a boiling water reactor having a system for removing and installing a pump assembly in a pressure housing in accordance with the present invention, including a transfer cask which is shown in a series of positions as it moves between a transfer cart and the pressure housing.

In accordance with the preferred embodiment of the present invention, a transfer cask or container 4 is lowered onto a pump pressure housing 2 which has its cover removed. The cask 4 is carried by a handling mechanism (not shown in detail in FIG. 1) which is movably mounted on the shield wall 1 which surrounds the reactor pressure vessel wall 3. The cask 4 is used to remove the pump assembly from the reactor and transport it from the containment.

In FIG. 1, cask 4 is shown in a series of positions as it moves between the transfer cart 30 and the pump housing 2. Suppression pool 22 is formed by an annular diaphragm floor 25, an annular base floor 23, a circular cylindrical inner bounding wall 21 and the circular cylindrical wall of the containment vessel 19. The diaphragm floor 25 is supported by inner bounding wall 21 and containment vessel 19. The transfer cart 30 rides on rails (not shown) arranged on annular diaphragm floor 25. A monorail 32 supported on the diaphragm floor has a hoist (not shown) for lifting the cask 4 from the transfer cart 30. To facilitate transport of the cask 4 through narrow spaces, the cask may be placed on its side on cart 30, as indicated by position A in FIG. 1. The monorail-mounted hoist is then used to place cask 4 in an upright position B and then carry the cask to position C, where the cask is engaged by and transferred to the handling mechanism. From position C, the cask can be lowered to position D along a vertical path. For the purpose of this discussion, position D is assumed to be located directly below position C and at an azimuthal position removed from the azimuthal position of the pressure housing 2. The handling mechanism further comprises means for rotating the cask along the outer circumference of shield wall 1 from position D to an azimuthal position overlying the pump pressure housing 2. The cask 4 can then be lowered into the loading position E, whereat the pump motor and impeller assembly can be loaded into the cask. Vertical displacement followed by rotation facilitates transport of the cask around an obstruction located at the height of position C but displaced therefrom by an azimuthal angle. Alternatively, the cask can be rotated first and then lowered to circumvent an obstruction located directly below position C. The pump assembly can be removed from the reactor by reversing the sequence of cask movements described above.

Figure 2:
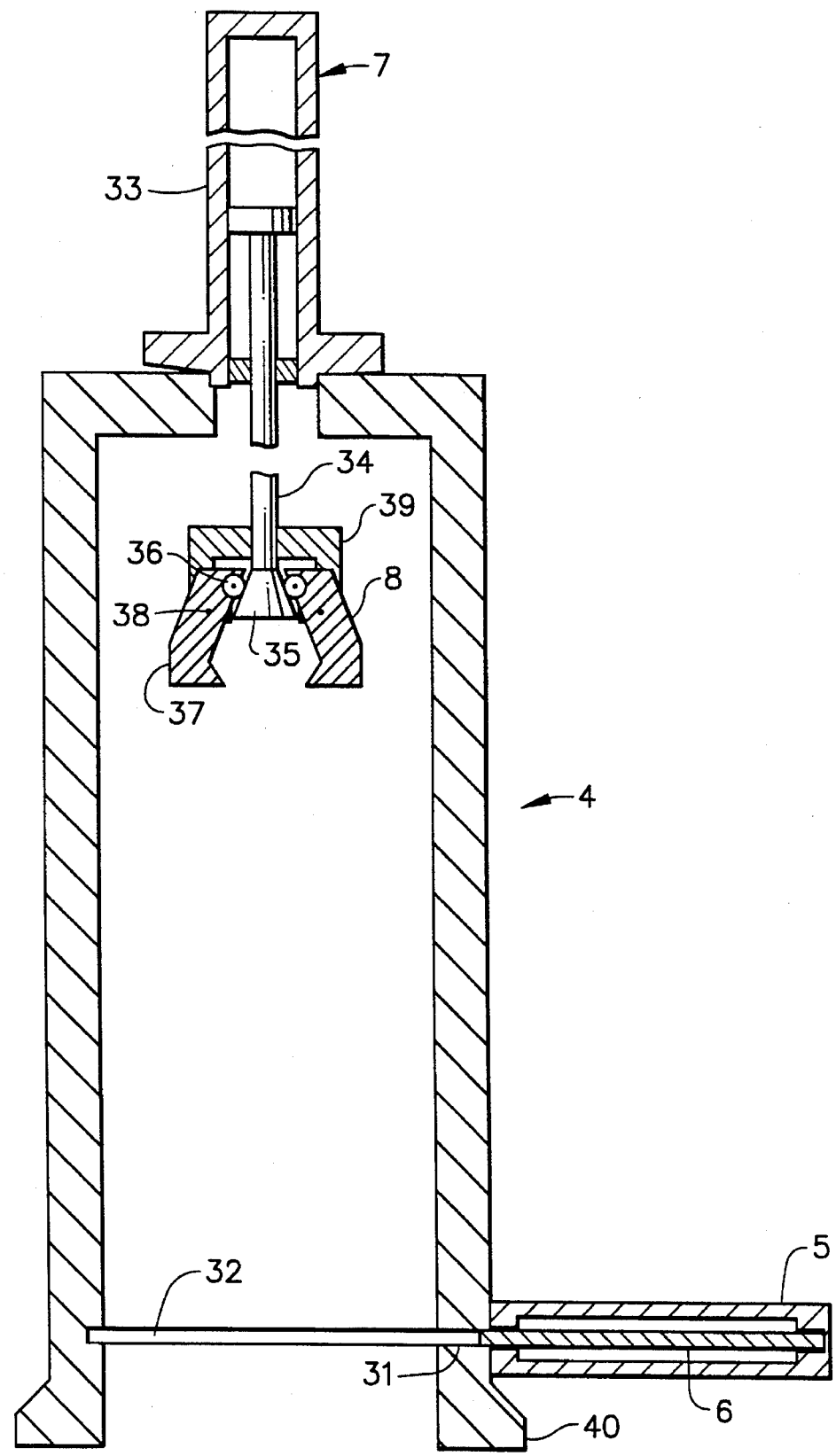
FIG. 2 is a schematic sectional view of the transfer cask in accordance with a preferred embodiment of the invention.

The cask 4 is a cylindrical container large enough to contain the pump motor and impeller assembly. Referring to FIG. 2, the cask is a water-tight container having a bottom which can be opened for receiving the pump assembly. Preferably, the cask has a rectangular or square cross section. Bottom closure is achieved by a slide valve comprising a valve housing 5 and a valve blade 6. The valve blade 6 enters the cask via a slit 31 and slides across the cask opening in grooves 32. The leading edge of valve blade 6 enters the groove which opposes slit 31 to fully close off and seal the cask interior from the cask exterior. Various seal arrangements may be used with the slide valve to effect a leaktight seal The upper end of cask has a hoisting mechanism 7 mounted thereon. The hoisting mechanism comprises an air-actuated cylinder 33 and a piston 34 which is slidable along the axis of the cylinder. When the piston 34 is retracted to a first position, a cam 35 on the end of the piston rod bears against a pair of rollers 36 mounted on respective ends of opposing fingers 37 of a grapple 8. Fingers 37 are pivotably mounted on a support member 39 via pivot pins 38. As the upper ends of fingers 37 are cammed outward, the fingers pivot to clamp the pump assembly (not shown). As the piston continues to retract, it reaches a second position whereat cam 35 abuts and lifts the support member 39. As piston 34 continues to retract beyond the second position, grapple 8 is raised until the grappled pump assembly is entirely inside the cask 4. The valve blade 6 is then slid into the closed position in preparation for removal of the cask.

Alternatively, a motor-driven rack and pinion or a cable winch may be used in lieu of the cylinder.

Figure 3:
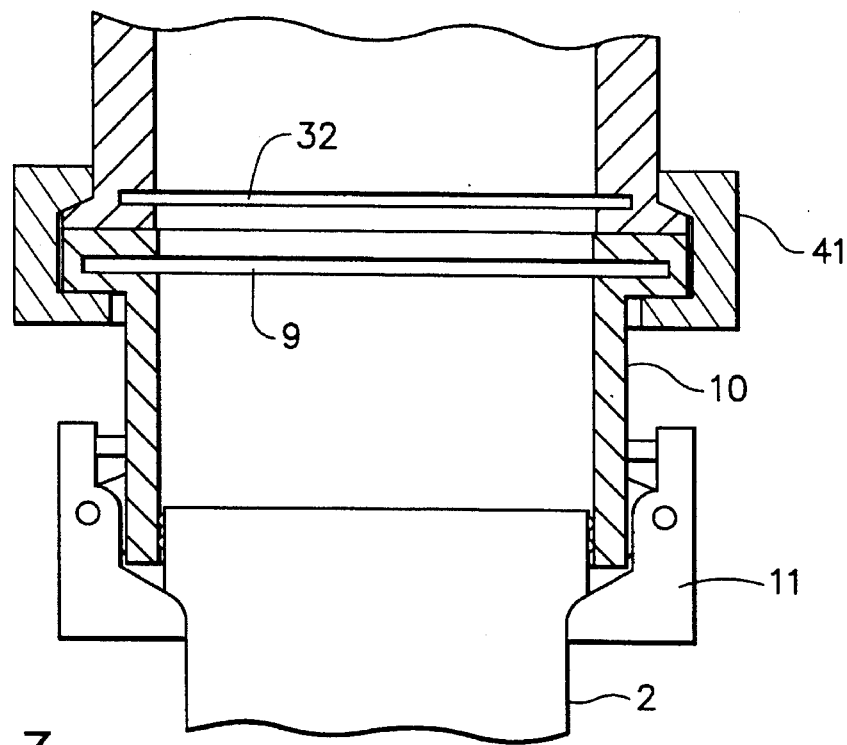
FIG. 3 is a schematic sectional view of a transition collar for coupling the transfer cask and other attachments to a pressure housing in accordance with the preferred embodiment of the invention.

The bottom outer diameter of the cask contains a tapered flange 40 that accommodates a quick disconnect split flange 41 to couple it with a flanged transition collar, as depicted in FIG. 3. The transition collar comprises an adapter 10 that mounts on top of the pump housing 2 and a valve similar in construction to the valve incorporated in the bottom of cask 4. Preferably the adaptor 10 comprises a flange having grooves 9 for receiving the valve blade (not shown). To close the adaptor, the valve blade is slid from the valve housing (not shown) into the grooves 9 until the upper end of the adaptor 10 is fully closed. The adaptor 10 is attached to the pump housing 2 by pivotable latches 11 which may actuated mechanically or hydraulically to latch under the flanged end of the pressure housing. Seals are installed between the outer circumference of pressure housing 2 and the inner circumference of the adaptor 10 to prevent leakage of water. The adaptor accommodates the various items that perform the servicing operations. The valve opens and closes to allow access when a tool is mounted and closes to seal against leakage when the tool is to be removed. The collar may be permanently installed but should generally be removable to allow for servicing of the valves and seals as required. If the collar is to be left with no tools on it for an extended period of time, a blind flange (not shown) may be installed to provide a secondary closure against leakage. Since the collar will fill with water during the various operations, it is equipped with a drain connection to which a drain valve is mounted. This allows the water to be drained to a suitable location.

Figure 4:
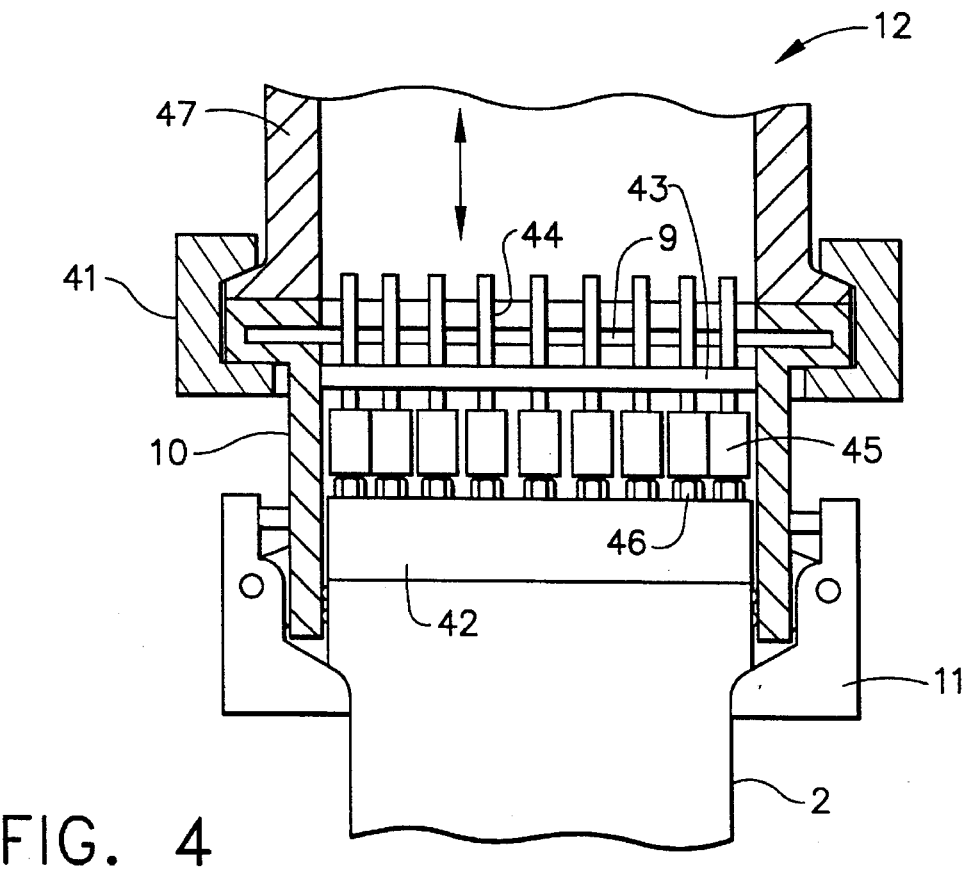
FIG. 4 is a schematic sectional view of a tool, which attaches to the transition collar, for torquing and untorquing the bolts which hold down the pressure housing cover.

Before a pump assembly can be removed from its pressure housing, cover 42 (see FIG. 4) must be unbolted and removed from pressure housing 2. When cover 42 is to be installed or removed, the cover is preloaded against its gasket by a loading mechanism (not shown) in the collar. Bolt removal is accomplished using a bolt torquing and untorquing tool, which can be either a multi-spindle wrench 12, as shown in FIG. 4, or a multi-head tensioner. The multi-spindle wrench 12 comprises a base 43 which rotatably supports a plurality of spindles 44. Base 43 is translatable along a vertical axis by conventional means (not shown) for linearly translating an assembly without rotation. Each spindle has a socket 45 arranged on its end for coupling with the head of a corresponding bolt 46 holding the cover 42 on housing 2. Wrench 12 can be provided with conventional means for driving the plurality of spindles to rotate.

The base 43 is vertically translatable relative to the tool housing 47 between bolt torquing and tool removal positions. In the bolt torquing position, the base 43 is lowered until the sockets 45 are coupled to bolts 46 for torquing or detorquing, depending on the direction of rotation of the spindles. In the tool removal position, the base 43 is raised until the sockets 45 are located above the plane of valve grooves 9. In the tool removal position, the valve blade incorporated in the transition collar is slid along grooves 9 until the top of the adaptor 10 is fully closed. With the transition collar closed, the multi-spindle wrench 12 can be uncoupled from the transition collar and removed.

Figure 5:
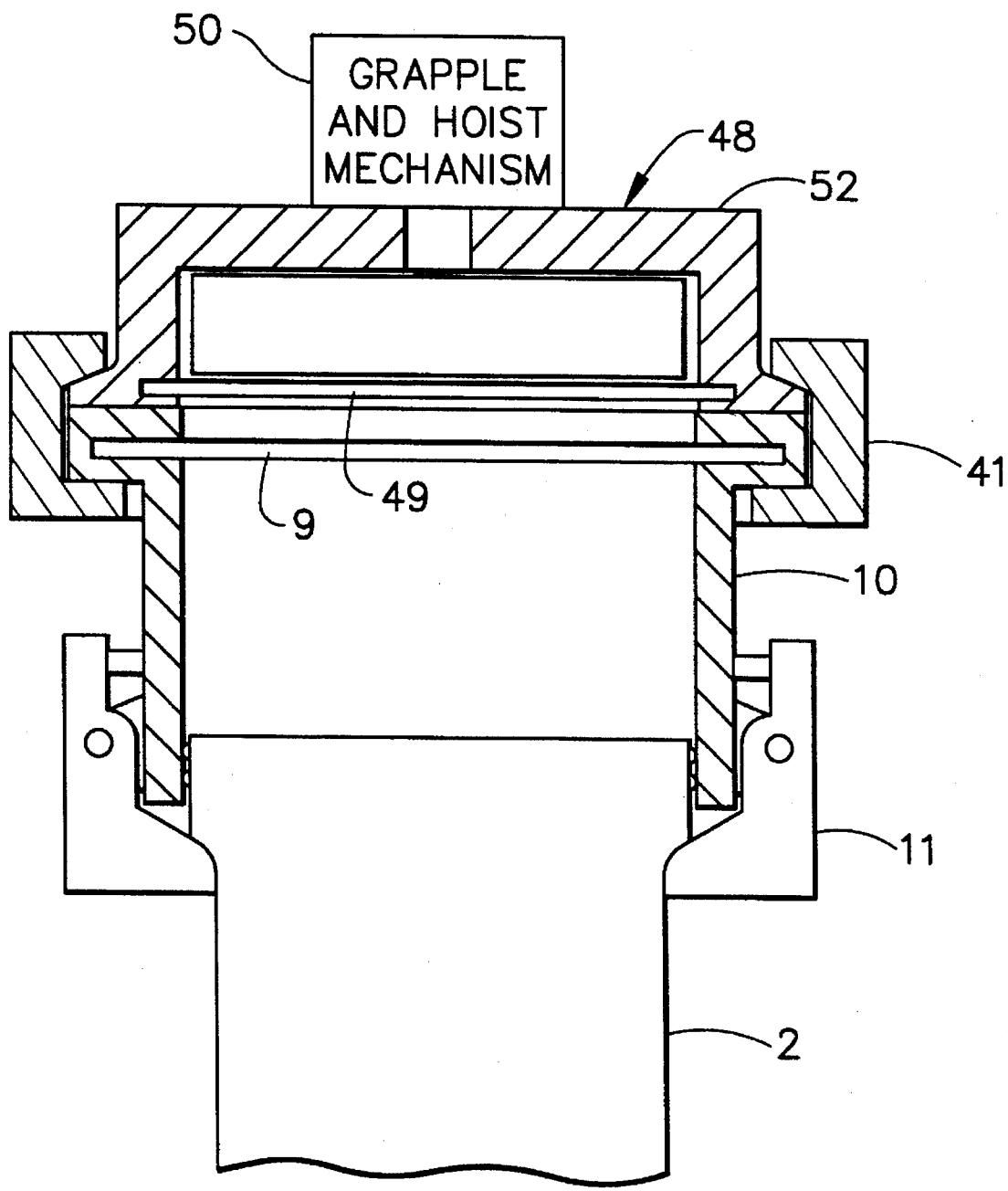
FIG. 5 is a schematic sectional view of a container, which attaches to the transition collar, for removing the pressure housing cover after the bolts have been removed.

After the cover bolts 46 are detorqued, the cover removal container 48, shown in FIG. 5, is installed. Container 48 comprises a housing 52, which preferably has a rectangular or square cross section, and a valve similar in construction to the valve incorporated in the bottom of cask 4, including grooves 49 for receiving a valve blade (not shown). The cover removal container is installed with its valve closed. To close the container 48, the valve blade is slid from the valve housing (not shown) into the grooves 49 until the bottom of the container is fully closed. After the cover removal container is securely coupled to the flange of the transition collar, the container valve is opened, as is the transition collar valve. Then the cover 42 is lifted into the housing 52 to a position above the plane of grooves 49, as shown in FIG. 5. The lifting is accomplished using a grapple and hoist mechanism 50 similar to but smaller than the mechanism shown in FIG. 2 for lifting the pump assembly. For this purpose, the cover 42 can be provided with a handle, hook or other means suitable for grappling. The transition collar valve is closed and then the cover removal container valve is closed. At this juncture, the cover removal container 48 can be removed. The cask 4 is then lowered into position for removing the pump assembly, as previously described.

Figure 8:
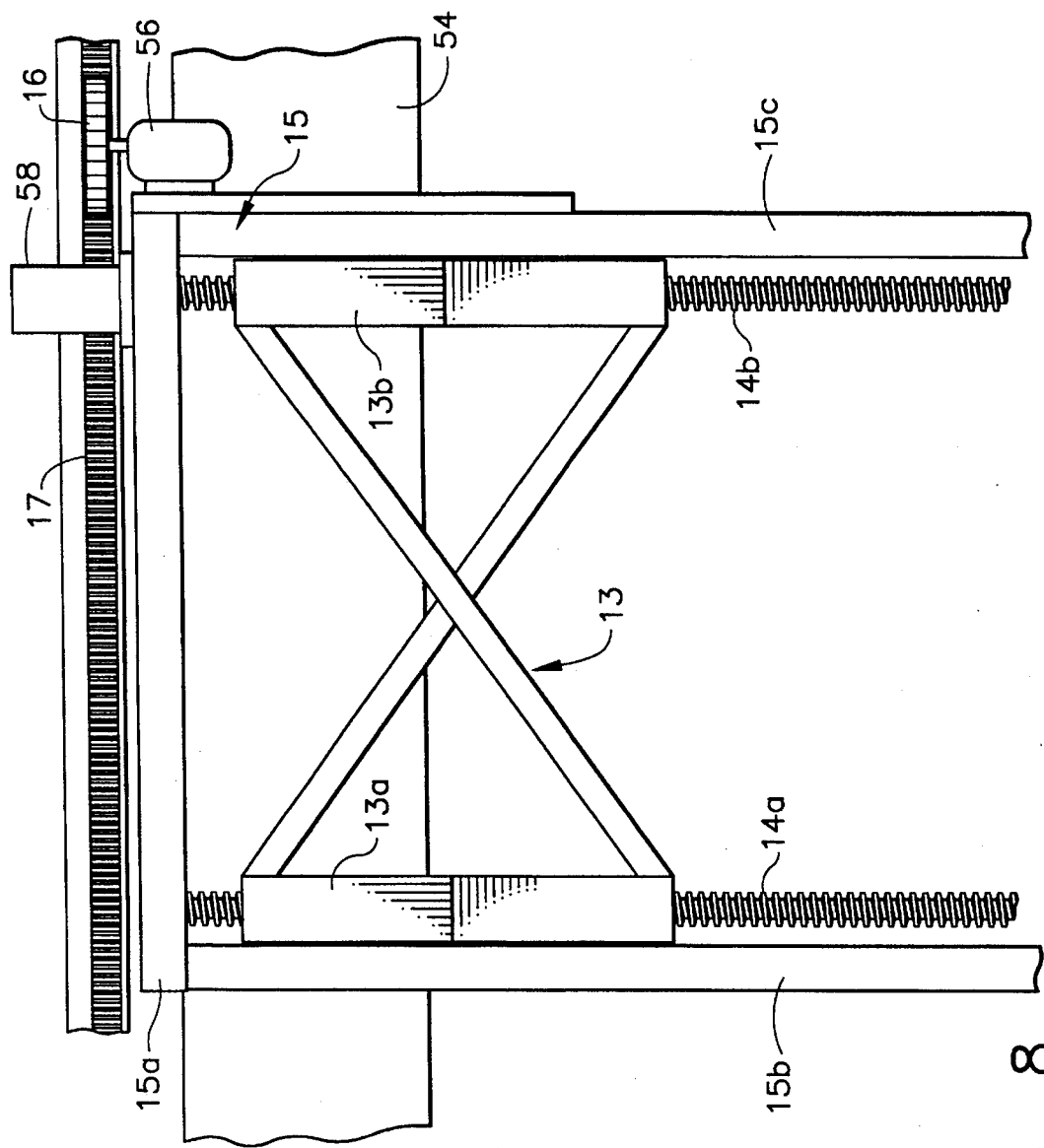

The various tools and containers are raised and lowered using a handling mechanism as shown in FIGS. 6–8. The handling mechanism comprises a horizontal arcuate track 54, mounted on shield wall 1, and two sets of rollers 55a and 55b which respectively roll along the upper and lower guide surfaces on track 54. The rollers are attached to a rotary carriage 15, which is thus able to travel horizontally along the arc of track 54. The carriage 15 supports a motor arranged with its drive shaft in a vertical position. A spur gear 16 is mounted on the end of the drive shaft of motor 56. The spur gear 16 has teeth on its outer periphery which mesh with the teeth of an arcuate rack 17 mounted in a horizontal plane on the shield wall. Thus, the carriage 15 can be driven to travel along the arcuate track 54 by actuation of drive motor 56.

As best seen in FIG. 8, the carriage comprises a horizontal upper beam 15a, a pair of vertical side beams 15b and 15c respectively attached at their top ends to opposing ends of the horizontal upper beam 15a, and a horizontal lower beam (not shown) attached at its opposing ends to the bottom ends of vertical side beams 15b and 15c respectively. The beams are welded together to form a rigid frame. This rigid frame provides support for a pair of lift screws 14a and 14b which raise and lower a yoke assembly 13 comprising a pair of yokes 13a and 13b. The tools and containers are equipped with trunnions (e.g., item 57 in FIG. 1) which engage yokes 13a and 13b. In accordance with a preferred embodiment, the screws 14a and 14b are driven to rotate in synchronism by a motor 58, the drive shaft of which is directly connected to screw 14b and which is coupled to screw 14a by way of a conventional chain-and-sprocket arrangement (not shown). Alternatively, screws 14a and 14b can be rotated by respective motors operating in synchronism.

The upper and lower ends of screws 14a and 14b are unthreaded for mounting in bearings attached to the upper and lower beams of carriage 15. The yoke assembly 13 has a pair of threaded bores which threadably engage the threaded portions of screws 14a and 14b respectively. Thus, as screws 14a and 14b are rotated in synchronism, the yoke assembly and any object carried thereon are raised or lowered, depending upon the direction of screw rotation.

The lifting mechanism in combination with the rotary carriage allow the cask to be moved into loading position E shown in FIG. 1. The rotation around the shield wall allows the tools and containers to be moved to a specific azimuthal position where there is overhead clearance to raise the various objects to the level of the refueling floor (not shown), where the objects can be transferred to a cart and removed from the drywell.

The foregoing preferred embodiment has been disclosed for the purpose of illustration. Variations and modifications which are the functional equivalent of the components disclosed herein will be apparent to persons skilled in the design of tooling. All such variations and modifications are intended to be encompassed by the claims hereinafter.

I claim:

1. A system for transporting an object having trunnions, comprising:

a carriage having a set of rollers;

a curved rail having a surface which supports said carriage via contact with said rollers, said surface lying in a horizontal plane;

means for driving said carriage to roll along said rail;

a yoke assembly carried by said carriage and adapted to vertically and laterally support the trunnions of an object; and means for driving said yoke assembly to displace vertically relative to said carriage.

2. The system as defined in claim 1, wherein said rail is mounted on the outer circumference of a circular cylindrical wall.

3. The system as defined in claim 2, wherein said circular cylindrical wall is a shield wall in a boiling water reactor.

4. The system as defined in claim 1, wherein said means for driving said carriage comprises:

a curved rack fixed in position relative to said curved rail, said rack having a multiplicity of teeth;

a gear rotatably supported on said carriage and having a multiplicity of teeth on its outer circumference, said gear being arranged such that some of said gear teeth mesh with some of said rack teeth; and a first motor mounted on said carriage for driving said gear to rotate, said carriage traveling along an arc in a horizontal plane in response to rotation of said gear.

5. The system as defined in claim 4, wherein said means for driving said yoke assembly comprises:

a first screw rotatably supported by said carriage and having a threaded portion with a vertical axis of rotation; and a second motor mounted on said carriage and coupled for driving said first screw to rotate, wherein said yoke assembly has a first threaded portion for engaging the threaded portion of said first screw, said yoke assembly displacing vertically relative to said carriage in response to rotation of said first screw.

6. The system as defined in claim 5, wherein said means for driving said yoke assembly further comprises a second screw rotatably supported by said carriage and coupled to said second motor, said second screw having a threaded portion with a vertical axis of rotation, and said yoke assembly has a second threaded portion for engaging the threaded portion of said second screw.

7. A device for coupling a container having a flanged bottom end to a pressure housing having a flanged top end, comprising:

an adaptor comprising a circular cylindrical wall having a flanged top end, said flanged top end having recesses which open on the interior surface of said adaptor;

a sliding valve blade adapted for sliding in said recesses between a first position whereat said adaptor is open and a second position whereat said adaptor is closed; and first and second latches arranged to latch the other end of said circular cylindrical wall of said adaptor to the pressure housing.

8. The device as defined in claim 7, further comprising means for sealing the interface between the inner circumference of said circular cylindrical wall of said adaptor and the outer circumference of said pressure housing.

9. The device as defined in claim 7, further comprising a split flange for clamping the flanged top end of said adaptor to the flanged bottom end of the container.

10. A system for removing an element from and installing an element in a pressure housing having a flanged top end, comprising:

a container having a flanged bottom end;

an adaptor comprising a circular cylindrical wall having a flanged top end, said flanged top end having recesses which open on the interior surface of said adaptor;

a first sliding valve blade adapted for sliding in said recesses between a first position whereat said adaptor is open and a second position whereat said adaptor is closed;

means for clamping the flanged bottom end of said container to the flanged top end of said adaptor; and means for latching the other end of said circular cylindrical wall of said adaptor to the pressure housing.

11. The system as defined in claim 10, wherein said flanged bottom end of said container has recesses which open on the interior surface of said container, further comprising a second sliding valve blade adapted for sliding in said recesses in said flanged bottom end between a first position whereat said container is open and a second position whereat said container is closed, whereby said adaptor is in communication with said container when said first and second sliding valve blades are in said first positions.

12. The system as defined in claim 10, further comprising means for sealing the interface between the inner circumference of said circular cylindrical wall of said adaptor and the outer circumference of said pressure housing.

13. The system as defined in claim 10, wherein said clamping means comprises a split flange.

14. The system as defined in claim 10, wherein said latching means comprises first and second latches pivotably mounted on said adaptor.

15. The system as defined in claim 10, further comprising a hoist mounted on top of said container, and a grapple located inside said container and coupled to said hoist.

16. The system as defined in claim 10, further comprising a bolt torquing and untorquing tool having a socket for engaging a bolt by which a cover is secured on the pressure housing, said bolt torquing and untorquing tool being mounted inside said container for translation between a first elevation whereat said socket lies below the plane of sliding of said first sliding valve blade and a second elevation whereat said socket lies above said plane of sliding of said first sliding valve blade.

* * * * *